United States Patent [19]
Randall et al.

[11] Patent Number: 5,539,293
[45] Date of Patent: Jul. 23, 1996

[54] ROTOR POSITION ENCODER HAVING FEATURES IN DECODABLE ANGULAR POSITIONS

[75] Inventors: Steven P. Randall; David M. Sudgen; Willliam Vail, all of Leeds; Geoffrey T. Brown, Hemingbrough, all of England

[73] Assignee: Switched Reluctance Drives Limited, Leeds, England

[21] Appl. No.: 255,700

[22] Filed: Jun. 7, 1994

[30] Foreign Application Priority Data

Jun. 7, 1993 [GB] Great Britain ............ 9311694

[51] Int. Cl.⁶ .................................... H02P 7/00
[52] U.S. Cl. ............................. 318/616; 318/439
[58] Field of Search ............ 318/701, 615–618, 318/254,138, 439, 430, 431, 625, 696; 324/160, 161, 163, 164, 166, 167, 173, 174; 310/62 R, 156 62 B, 268; 341/9, 13

[56] References Cited

U.S. PATENT DOCUMENTS

| | | | |
|---|---|---|---|
| 3,378,741 | 4/1968 | Sutton | 318/685 |
| 3,540,040 | 11/1970 | Sheane | 341/9 |
| 4,107,594 | 8/1978 | Jacobs | 318/685 |
| 4,507,590 | 3/1985 | Miyazaki | 318/254 |
| 4,672,274 | 6/1987 | Suganuma | 318/254 |
| 4,697,125 | 9/1987 | Goff et al. | 318/254 |
| 4,728,833 | 3/1988 | Shiraki et al. | 318/254 X |
| 4,737,674 | 4/1988 | Miyao | 318/254 X |
| 4,748,387 | 5/1988 | Tanuma et al. | 318/254 |
| 4,899,093 | 2/1990 | Gleim | 318/138 X |
| 4,990,843 | 2/1991 | Moren et al. | 318/701 |
| 5,107,159 | 4/1992 | Kordik | 310/156 |
| 5,111,095 | 5/1992 | Hendershot | |

FOREIGN PATENT DOCUMENTS

| | | |
|---|---|---|
| 0378351A3 | 7/1990 | European Pat. Off. . |
| 0485751A1 | 5/1992 | European Pat. Off. . |
| 0601818 | 6/1994 | European Pat. Off. . |
| WO90/00325 | 1/1990 | WIPO . |

*Primary Examiner*—Jonathan Wysocki
*Attorney, Agent, or Firm*—Patterson & Keough

[57] ABSTRACT

A rotor position encoder for an electric motor includes a discate member mounted to rotate with the rotor shaft. The encoder has a set of radially extending features formed with angularly evenly spaced leading edges and unevenly spaced trailing edges. The leading edges induce a signal in a sensor that corresponds to the relative timing of power switches for each motor phase. The trailing edges define a cyclical code by which motor controlling circuitry is able to determine the phase of rotation of the rotor and thus establish the correct power switch actuation sequence. An electric motor control system and methods of starting electric motors are also shown.

28 Claims, 6 Drawing Sheets

ROTOR POSITION ENCODER HAVING FEATURES IN DECODABLE ANGULAR POSITIONS

BACKGROUND OF THE INVENTION

1. Field of the Invention

This invention relates to control systems for electric machines, an encoder for an electric machine from which the position of the rotor relative to the stator is derivable and methods of starting electric machines. The invention is particularly, though not exclusively, applicable to switched reluctance (SR) machines.

2. Description of Related Art

The switched reluctance drive is a variable-speed drive system comprising an electric motor supplied from a power-electronic converter under the control of low-power control electronics. The motor has salient poles on both the stator and the rotor, typically with an excitation coil around each stator pole. These stator coils are grouped to form one or more phase windings. The electrical currents in the windings are typically switched on and off by power-electronic switches.

The timing of the switching of the currents in the windings is controlled in relation to the relative angular position of the stator and rotor poles. This relative position may be detected by a rotor position transducer which consists of a rotating member and stationary sensors which supply signals to the control electronics. In single and two-phase systems only a single sensor is required, but motors with more than two phases generally use more than one sensor according to the prior art.

FIG. 1 shows a schematic diagram of a typical 3-phase SR motor, which has six stator poles and four rotor poles. The poles carrying coils A and A' have opposite magnetic polarisation. Phases B and C are formed similarly.

A rotor position transducer (RPT) is used to ensure that the currents of the phase windings are switched on and off at the appropriate angles of rotation. FIG. 2a illustrates a typical system consisting of a rotating slotted disc and three optical sensors which are switched by the rotation of the disc.

FIG. 2b shows the idealised variation of the inductances of the phase windings as functions of angle of rotation θ. Positive torque is defined as that which acts in the direction to move the rotor in the direction of positively increasing θ. Such torque is produced by any phase when the winding of that phase carries current and the angle of rotation is such that the inductance is increasing with increasing θ. Negative torque is produced when a phase carries current during that part of its inductance cycle where the inductance is decreasing with increasing θ (or increasing with decreasing θ).

It will be apparent therefore that for normal positive torque operation in the direction of increasing θ (the forward direction) each phase is energised in turn when its inductance is increasing. FIG. 2b also shows the three output signals of the sensors according to prior art. In general the RPT consists of three sensors, which may for example, be optical, magnetic or inductive, which cooperate with a rotating member, for example a disc with cut out slits, to produce signals such as those shown in FIG. 2b as $RPT_A$, $RPT_B$ and $RPT_C$. Thus the signal $RPT_A$ changes from zero to a positive value at the centre of the minimum inductance region of phase A and returns to zero at the maximum inductance position of phase A. The signals $RPT_B$ and $RPT_C$ behave in the same manner for phases B and C respectively. It will be clear that whether the rotor is starting from rest in either the forward or backward direction or running in either direction, the RPT signals enable the control electronics to excite the appropriate phase winding over the appropriate angle of rotation to produce torque in the desired direction.

The torque developed by the motor may be controlled at low speeds by adjusting the magnitude of the current in the phase windings over the fixed angle defined by the respective positive or negative RPT signals depending on the desired direction of torque. At high speed the torque is normally controlled by adjusting the angle over which a phase winding is switched onto the power supply and the angle with respect to the inductance cycle at which the switching on takes place, i.e. by timing the switching on and off of the phase energisation with reference to the RPT signals. It will be clear from FIG. 2b that the combined RPT signals can be used to determine the rotor position to one sixth of a phase period thus giving a 15 degree resolution. For more refined control of switching angles, each of these six regions can be interpolated, for example, by using a high frequency pulse train which is phase locked to the low frequency RPT signals as described in GB 1597790 (Stephenson).

U.S. Pat. No. 4,990,843 (Moren) describes a method by which the three detectors of FIG. 2a may be replaced by a single detector. The rotating disc incorporates six or twelve slots, giving a sensor signal which has respectively a rising or falling edge every 30 degrees of rotation, or a falling edge every 30 degrees of rotation, which may be used to switch the phase winding currents of the motor. However, the method suffers from the serious disadvantage that correct tracking of the relationship between edges and phases may be lost due to electrical noise, for example, in the sensor signal.

SUMMARY OF THE INVENTION

It is one object of the present invention to provide improved means by which a simplified detector arrangement can be used for motors with one, two or more phases with consequent benefits of simplification of the system and economy in cost.

It is another object of the invention to provide start-up procedures for electric machines using position information from a rotor encoder.

According to the invention there is provided a control system for an electric machine having a rotor defining rotor poles arranged to rotate relative to a stator, the system comprising a controller, switch means for the or each phase of the motor which switch means are actuatable by the controller, a set of features arranged to rotate with the rotor and a single sensor arranged to be influenced by the features as they rotate with the rotor to produce an output receivable by the controller, the features defining the output of the sensor in the form of a digital code which is periodic with the phase inductance cycle of the machine, the code being decodable by the controller to indicate the positions of the rotor poles in the rotor cycle relative to the stator.

By 'phase inductance cycle' is means the inductance of the machine as seen from the terminals of the or each phase winding. The phase inductance cycle is a function of rotor position and varies cyclically within the rotor cycle between given inductance values, for example inductance maxima or minima.

According to the invention there is also provided a rotor position encoder, defining a position code for a rotor of an electric machine relative to its stator, the encoder comprising a set of features mountable to rotate with the rotor for influencing the output of a sensor, the features having sensor output influencing first parts which are in evenly spaced angular positions, and sensor output influencing second parts which are in unevenly spaced angular positions, the said angular positions of the second parts relative to the first parts being decodable as a sequence such that the position of the rotor relative to the stator is determinable from the sequence.

The period of the said sequence may coincide with the period of the phase inductance cycle. However, the period of the sequence could equally well be a sub-multiple of the period of the phase inductance cycle or it could be periodic with one revolution of the rotor. In any of these cases the state of the sequence is decodable to determine the rotor position within the phase inductance cycle.

The evenly spaced first parts may coincide with the power switching actuation positions, or otherwise indicate the positions of the rotor poles as they rotate from which indications of switching timing can be derived, and the second parts create the code by their respective positions relative to adjacent first parts. The code can be used to check the rotor position as well as to determine it. For example, if an electrical noise spike corrupted the sensor output the counting from the first parts of the code would be in error. The reestablishment of a correct code can then be used to establish the position of the rotor relative to the stator and to correct positional information counted from the passing first parts.

Preferably, the first and second parts of the features of the encoder are associated, such that the second parts are interjacent the first parts. However, this is not essential. Using two sensors the encoder may have a first encoder portion being the first parts and a separate portion bearing the second parts which define the sequence independently of the positions of the first parts.

The encoder is conveniently a discate member mountable on a rotor shaft. The features may influence the sensor magnetically, by means of the Hall effect, through light transmissive/non-transmissive parts or light reflective/absorbing parts, by capacitive or inductive effects or by other known means.

One advantage of the invention is that only one detector is required to determine reliably the position of the rotor relative to the stator. When the second parts are positioned relative to the first parts only one sensor is required to determine both the switching timing for the electric machine switching means and the position of the rotor relative to the stator. From one sensor it is also possible to tell when an error is induced in the rotor position sensor output and to reestablish the correct positional information thereafter from the subsequent output from the sensor.

The invention also extends to an electric machine control system comprising an encoder according to the invention operably connected to rotate with the machine, a sensor arranged to be influenced by the features on the encoder to produce a coded signal output, control means, including signal storage means, supplied with the output from the sensor and operable to store the sequence to determine the position of the rotor relative to the stator from the state of the sequence, and machine phase switching means which are actuatable according to the position of the rotor relative to the stator.

The sensor may be arranged to provide a signal transition, e.g. a rising or falling edge, to denote the passage of the first or second part of the feature. Preferably, transitions in one sense indicate the first parts and the interjacent transitions in the opposite sense indicate the second parts. Alternatively, successive transition in the same sense could be used to indicate the passage of first and second parts of the features alternately.

The control means may also including clock means for determining the interval between transitions, and decoding means arranged to decode the intervals between transitions in the sequence. For example, the decoding means may be operable to distinguish between binary states on the basis of the interval between transitions, the interval being determined relative to the rate of rotation of the rotor.

Preferably, the means include shift register means for receiving the sequence serially as the rotor rotates. The shift register is readable by the control means to determine the state of the sequence.

Also according to the invention there is provided a control system for an electric machine comprising a sensor, an encoder operably connected to rotate with the machine, the encoder defining a position code for a rotor of the polyphase electric machine relative to its stator, the encoder comprising: a set of features mountable to rotate with the rotor for influencing the output of the sensor, the features having sensor output influencing first parts which are in evenly spaced angular positions and sensor output influencing second parts which are in unevenly spaced angular positions, the said angular positions of the second parts relative to the first parts being decodable as a sequence such that the position of the rotor relative to the stator is determinable from the sequence; the system further including control means, including signal storage means, supplied with the output from the sensor and operable to store the sequence to determine the position of the rotor relative to the stator from the sate of the sequence; and machine phase switching means which are actuatable by the control means according to the determined position of the rotor relative to the stator.

The invention also extends to a method of controlling an electric machine which includes an encoder defining a position code for a rotor of the electric machine relative to its stator, the encoder comprising: a set of features arranged to rotate with the rotor for influencing the output of the sensor, the features having sensor output influencing first parts which are in evenly spaced angular positions, and sensor output influencing second parts which are in unevenly spaced angular positions, the said angular positions of the second parts relative to the first parts being decodable as a sequence such that the position of the rotor relative to the stator is determinable from the sequence; the method comprising sensing the movement of the features past the sensor; decoding the sequence from the second parts of the features; determining the switching phase for the machine according to the state of the sequence; and timing the switching of the machine according to the first parts of the said features passing the sensors.

Preferably, the passage of the first parts is used as a running count to maintain a contemporary account of the position of the rotor relative to the stator and the code sequence is used to derive or to reestablish the rotor position information in the event that it is lost or corrupted.

Also according to the invention there is provided a method of starting an electric machine, comprising a rotor, defining rotor poles, a stator defining stator poles, an encoder arranged to rotate with the rotor and to provide a rotor position code, a sensor arranged to be influenced by the encoder according to the position code and to produce an output thereof, and a controller for receiving the output from the sensor, the method comprising: energising at least a selection of the stator poles to orientate the rotor with respect to the stator into a predetermined position; initiating a count of the rotor position from the known position; accelerating the rotor according to the continued energisation of the stator poles based on the position count derived from the encoder.

Also according to the invention there is provided a method of starting a polyphase electric machine, in which the encoder comprises a set of features mountable to rotate with the rotor for influencing the output of a sensor, the features having sensor output influencing first parts which are in evenly spaced angular positions, and sensor output influencing second parts which are in unevenly spaced angular positions, the said angular positions of the second parts relative to the first parts being decodable as a sequence such that the position of the rotor relative to the stator is determinable from the sequence; the method including counting the said first parts to monitor the passage of the rotor past the stator and thereafter checking the rotor position from the count with the decoded sequence.

Preferably, the position of the rotor relative to the stator is initialised for starting by locking the rotor in an initial position by energising.

The encoder can be used to determine the orientation of the rotor relative to the stator from the intermediate position of the rotor and the output from the sensor when the rotor is in that intermediate position.

Preferably, the method includes switching one of the phases of the machine thereafter to cause rotation of the rotor between angular positions at which the said switched phase can further rotate the rotor.

It may be necessary to develop a suitable motor speed before polyphase control of the motor can be initiated. In this case this 'single' start-up running of the motor according to the invention may be effected for more than one cycle of the rotor until the rotor speed allows the rotor position to be accurately determined at any position.

The invention also extends to a method of starting a single phase electric machine in which the encoder comprises: a set of features arranged to rotate with the rotor for influencing the output of a sensor, the features having sensor output influencing first parts which are in evenly spaced angular positions, and sensor output influencing second parts which are in unevenly spaced angular positions, the said angular positions of the second parts relative to the first parts being decodable as a sequence such that the position of the rotor relative to the stator is determinable from the sequence, the method further including counting the said first parts to monitor the passage of the rotor past the stator and thereafter checking the rotor position from the count with the decoded sequence.

These and other features of the invention are defined in the accompanying claims.

The present invention can be put into practice in various ways some of which will now be described by way of example with reference to the accompanying drawings in which:

DETAILED DESCRIPTION OF PREFERRED EMBODIMENTS

Figure 7A:
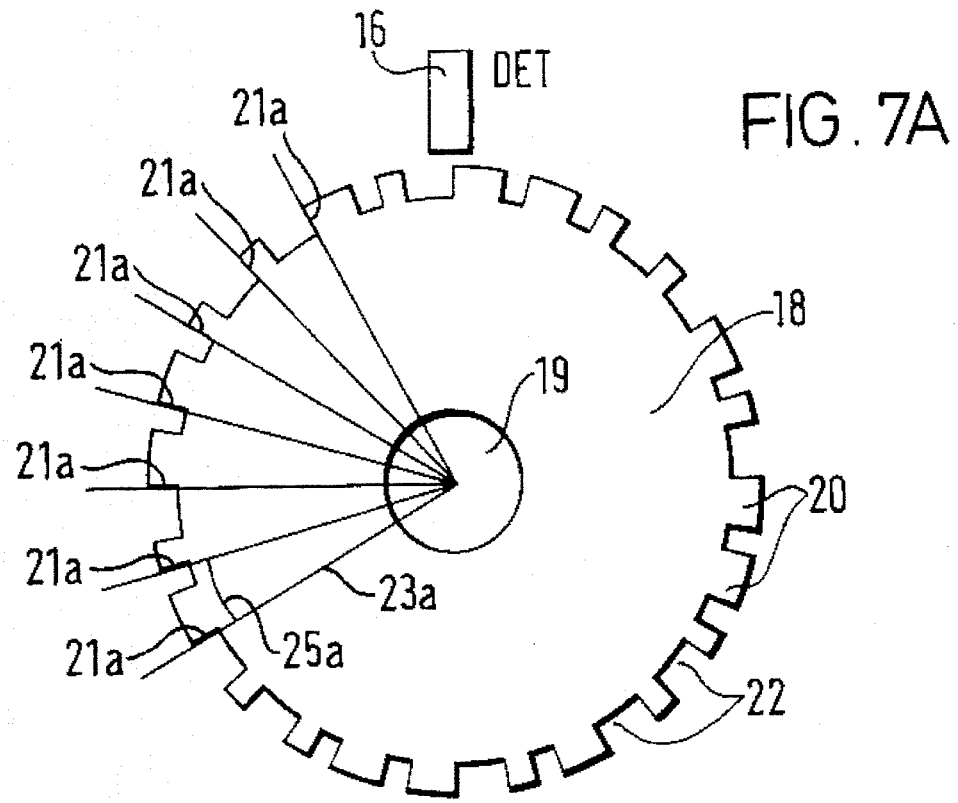
FIGS. 7(A–B) illustrate an encoder according to the invention.
Figure 7B:
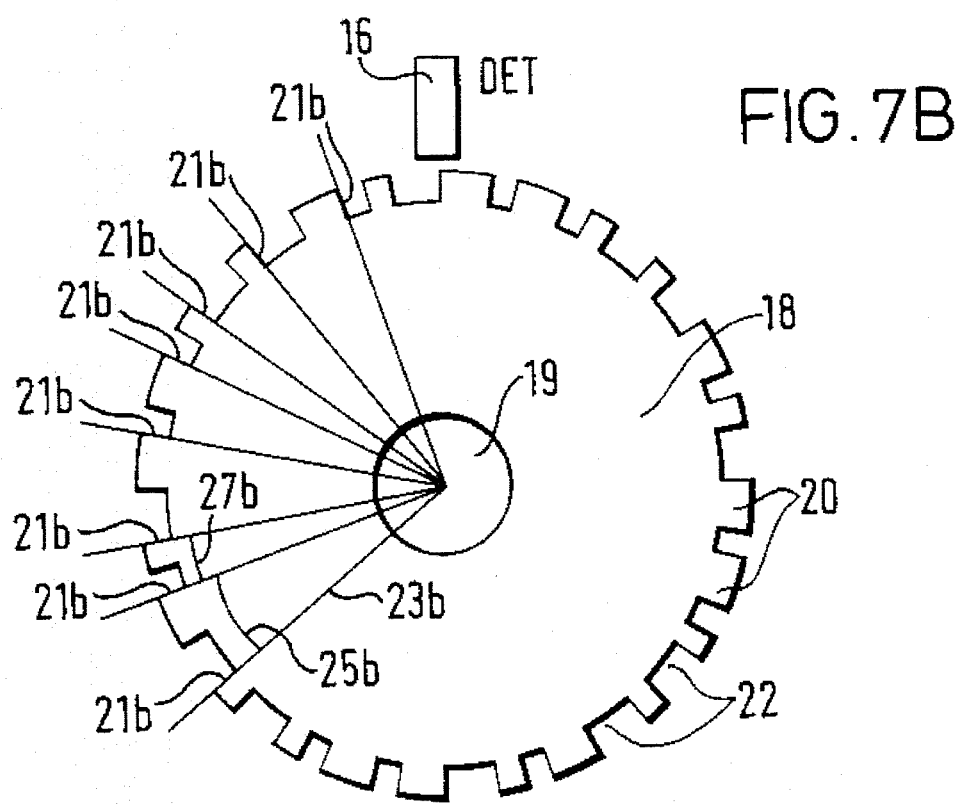

FIGS. 7A and 7B illustrate an encoder according to the invention showing even and uneven angular positioning of rising and falling edges according to an embodiment of the invention.

Figure 1:
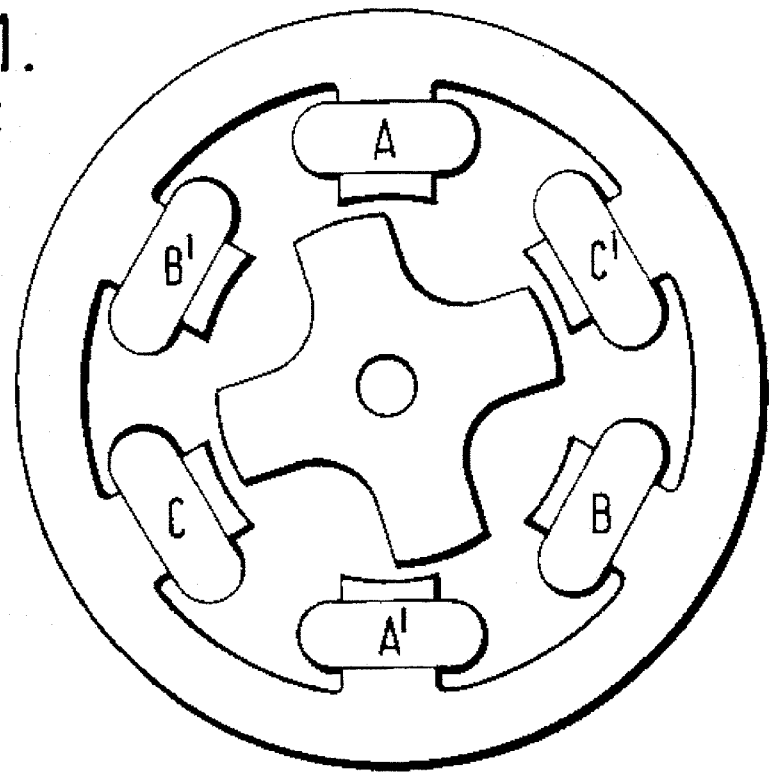
FIG. 1 is a schematic diagram of a typical 3-phase SR motor.
Figure 2A:
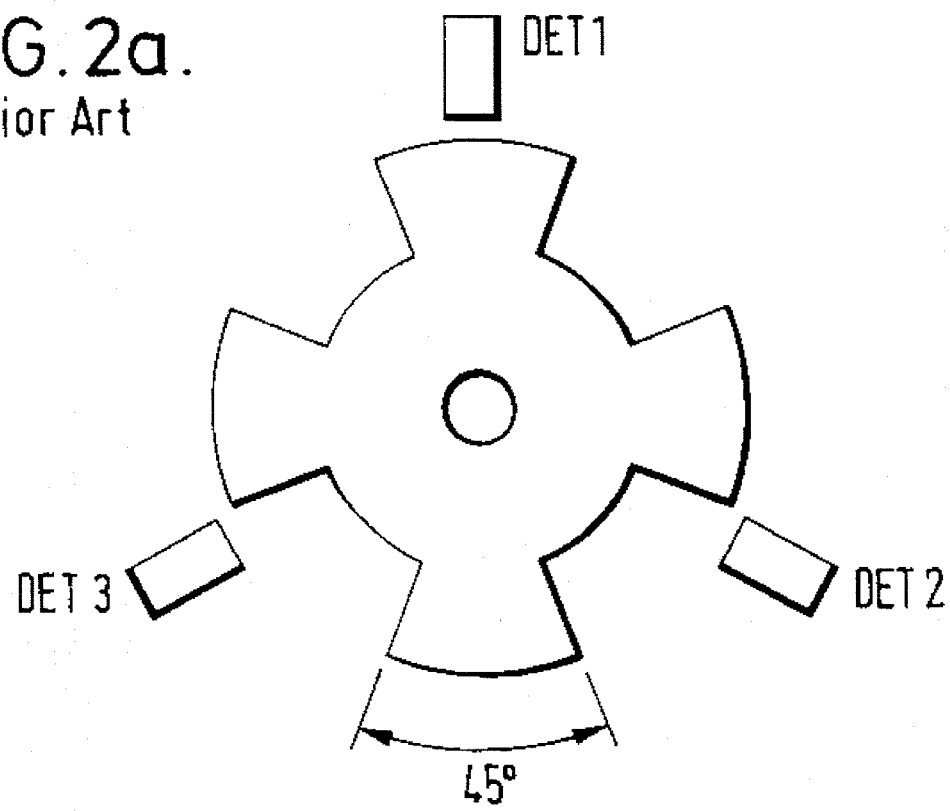
FIG. 2a illustrates a typical system including a slotted disc and optical sensors.
Figure 2B:
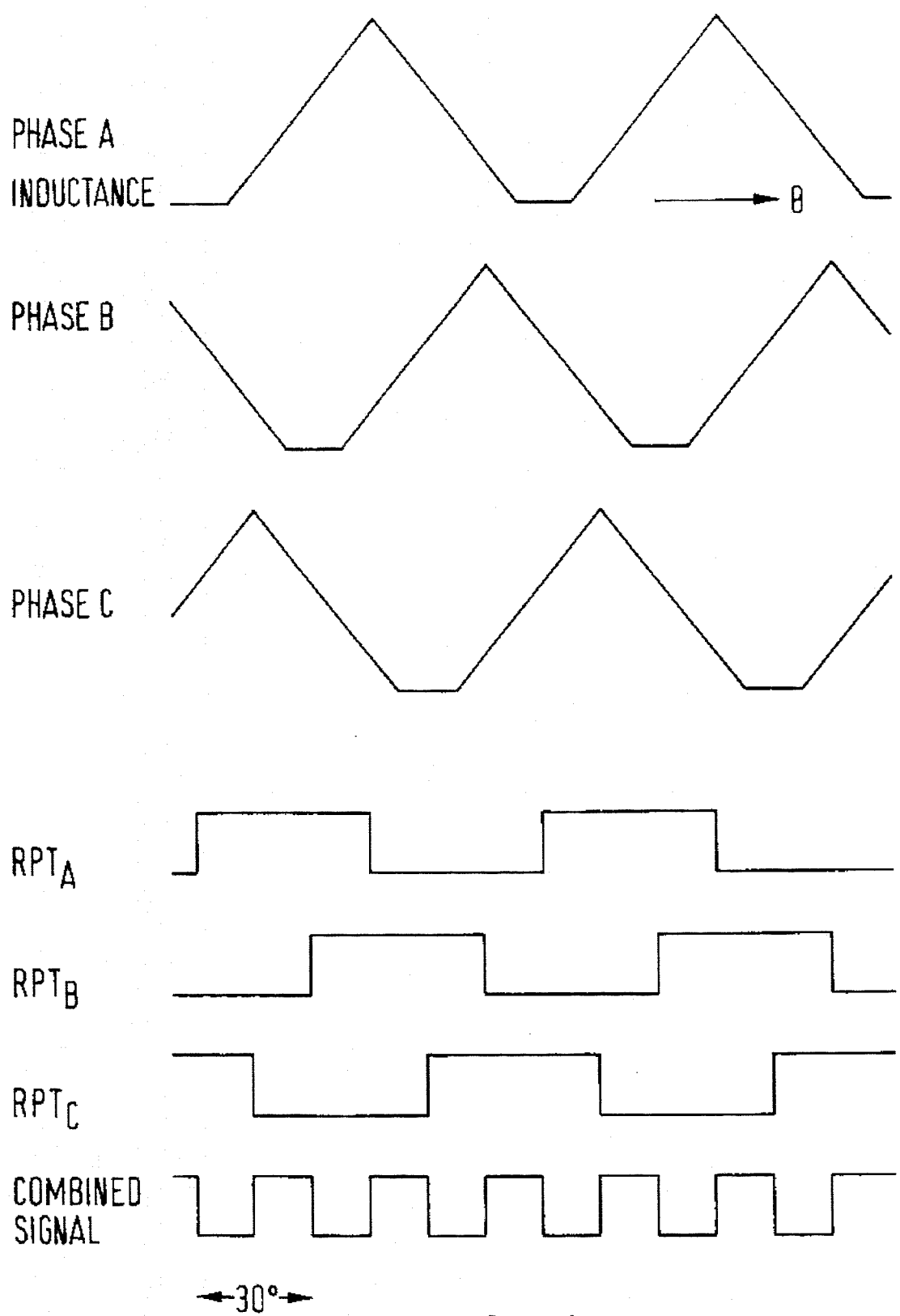
FIG. 2b is a chart showing idealized variation of phase winding inductance, and showing sensor output signals, as a function of angle of rotation.
Figure 6:
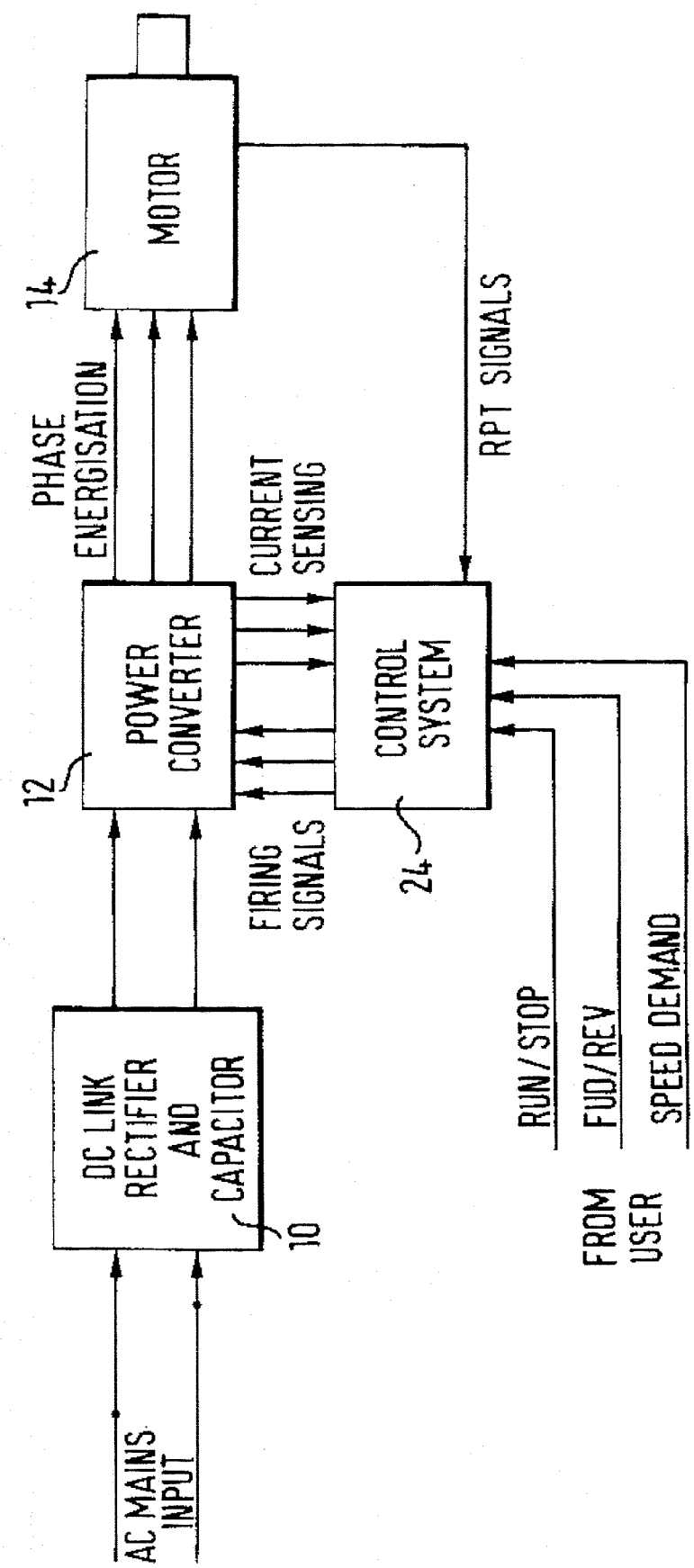
FIG. 6 is a circuit diagram of a motor control circuit for a switched reluctance motor.

Referring to FIGS. 6 and 7, a control system for a switched reluctance motor comprises a rectifying and smoothing circuit 10 which receives an a.c. mains input. The smoothed rectified d.c. output from the circuit 10 is applied to a power convertor 12 which provides a three phase switched supply for a 6 stator pole/4 rotor pole, 3 phase switched reluctance motor 14 as shown in FIG. 1. The power convertor comprises a set of phase power switches such as electronic power transistor switches which gate the supply of d.c. current to the 3 motor phases.

A rotor position sensor 16 is arranged at the periphery of a shaft encoder 18 mounted to rotate with the rotor shaft 19 (see FIG. 7). The sensor 16 may be a Hall effect sensor or an optical sensor. The encoder is formed with a sequence of features of marks and spaces 20, 22 defining a set of rising edges and falling edges in a single path. In the case of a Hall effect sensor these may be constituted by a sequence of lands and recesses which are respectively closer to and more distant from the sensing face of the sensor 16 or a sequence of coded magnetised regions in the path of the sensor. In the case of an optical sensor there is also a light source and the marks and spaces may be respectively constituted by light absorbing and light reflecting parts or light passing slots and light blocking castellations defining rising edges and falling edges. Of course, other forms of sensor, such as a capacitance sensor, could be used to equal effect.

The signals from the sensor are transmitted to a microprocessor-based controller 24. Based on the information received from the sensor, the feedback from the power switches in the form of phase current sensing signals and the drive commands from the user, the controller 24 issues signals to the power switches. It will be appreciated by the skilled person that other forms of controller are contemplated, such as a hard-wired logic controller.

The single detector method overcomes the problem of loss of tracking in the prior art. The falling or trailing edges (i.e. the trailing edges producing a low output from the sensor) in this system are used to give more information on actual position and direction of rotation. For example they may be placed at either ¼ or ¾ of the distance between adjacent rising edges (i.e., those (first) parts of the features producing a high output from the sensor) thus producing either a short or a long pulse respectively as the rotor rotates. As shown in FIG. 7, for example, first parts 21a, that is, rising edges, produce a high output from the sensor and are in evenly spaced angular positions around shaft encoder 18. Second parts 21b, that is, falling edges, produce a low output from the sensor and are in unevenly spaced angular positions around shaft encoder 18. The angular positions of the falling edges relative to the rising edges are decodable as a sequence to determine rotor position.

More specifically, as shown in FIG. 7A, rising edges 21a are in evenly spaced angular positions around encoder 18. For purposed of illustration, rays 23a are shown in FIG. 7A extending from a center of encoder 18 to each rising edge 21a are in evenly spaced angular positions around shaft encoder 18. As shown in FIG. 7B, on the other hand, falling edges 21b are in unevenly spaced angular positions around encoder 18. For purposes of illustration, FIG. 7B shows rays extending from a center of encoder 18 to each of the falling edges 21b. The angles formed between rays 23b vary; for example, angle 25b is different than angle 27b. Thus, falling edges 21b are in unevenly spaced angular positions around encoder 18.

The short and long pulses described above may be spaced around the disc in a repeating pattern consisting of six pulses corresponding to one phase period. The phase period repeats every 90° of the encoder. The pattern chosen may be 'LLSSLS' where L=long pulse and S=short pulse. To give binary numbers for the decoding logic, a long pulse may be decoded as a '1' and a short pule decoded as a '0'. This gives an output code sequence of '110010' which continually repeats as the disc is rotated past the sensor. The sequence of circumferential marks and spaces in the encoder of FIG. 7 is a reproduction of the sequence 110010 according to this convention. Although a 6-bit code is used, 3-bits is adequate to create a code to identify the rotor position with sufficient resolution within the phase period. The additional redundancy in the 6-bit sequence allows more reliable error checking.

Figure 3:
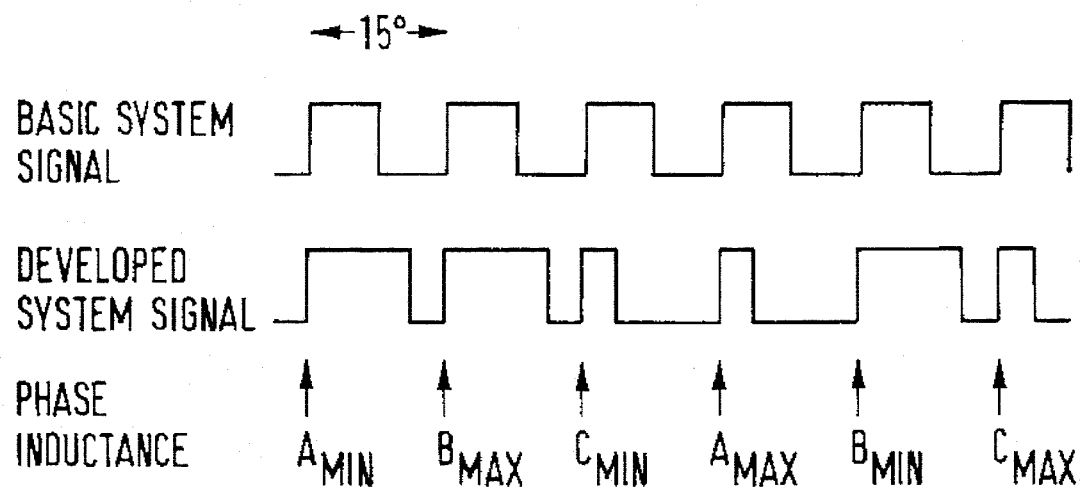
FIG. 3 is a timing diagram for the rotor position sensor output in accordance with the invention.

When the rotor is rotating, the code may be read in with the last six bits being stored. The code may be updated when each rising edge is received. The state of the received code then gives the position of the rotor to within one sixth of a phase period, as for the original three-detector system. FIG. 3 shows the example sensor code in relation to the maximum and minimum inductance positions for the three phases. It will be clear that the code could be positioned with any 15 degree orientation in relation to the phase inductances.

While the code sequence is arranged to repeat on the encoder every phase inductance cycle in this embodiment, i.e. once per rotor pole, the position information could be derived from a longer code spanning up to the complete circumference of the encoder disc. However, the shorter sequence coinciding with the phase inductance cycle provides all the information for position and timing necessary while keeping the sequence period as short as possible without ambiguity.

The position of the rotor as derived from the code sequence may be compared with the position determined by counting, from a known initial position, the rising edges of the sensor signals as in the basic system. The code repeats itself and is fed serially into a shift register within the controller. Therefore, the constant monitoring of the code allows the controller to determine the rotor position according to the state of the sequence in the shift register. If a full correct code is received then it may be assumed that this gives the correct position. If this position also matches the counted position, correct operation is confirmed. If it does not match the counted position, it may be assumed that an error has occurred and the counted position may be updated to coincide with the position defined by the code sequence, thus detecting and correcting the error. The drive should then continue to work normally by counting the rising edges. If, however, no correct code is available from the sensor input (e.g. if the code has been corrupted by electrical noise), the drive may continue to operate by counting the rising edges or may be switched off and allowed to coast until a correct code sequence is received.

If the direction of rotation is to be reversed, the sensor output may be inverted to keep the evenly spaced edges as rising edges. The received code will then be the same as in the forward direction, but in a difference angular position relative to the stator poles. The starting of the drive (discussed later) and the reading of the code will be the same as for the original direction of rotation, but the conversion from the code input to the three detector equivalent outputs, i.e. the sequencing of the three phases, will be different.

To decode the output of the sensor one looks at the mark/space ratio of the incoming signal at every rising edge and determines if the last pulse was long or short. If the pulse was long then it may be decoded as a one and if it was short to decode it as a zero. The decoded bit may then be input to the shift register of six bits length so keeping a record of the recent history of the sensor output, the state of the sequence being a reflection of the rotor position. A simple way to decide if the pulse is long or short is to count the time for which the signal is high and the time for which it is low and then to compare them. If the time were counted by a fixed rate clock, then the clock rate would have to be high to achieve a good resolution at the top speed. This would require a large number of bits to enable the system to operate at the lower speeds. For this reason a clock rate may be used which is frequency-locked to the (angularly evenly spaced) rising edges of the RPT input.

It was noted above that operation of the single-detector system required knowledge of the initial position of the rotor at starting. A known initial position may be achieved as follows. If any one phase is excited for a time, the rotor will usually be pulled into approximate alignment with the maximum inductance position of that phase. Alternatively, if two phases are simultaneously excited for a time, the rotor may be pulled approximately to the position between the two maximum inductance positions at which the positive and negative torques of the two phases balance each other. It is possible that the initial rotor position will occasionally correspond to an undesired zero-torque position and the rotor will therefore fail to be pulled into the desired alignment. Failure to pull in to the desired initial position will probably result in failure to start correctly. This condition may be detected and the motor stopped and restarted.

If such a false start cannot be tolerated, it may be avoided by following an initialisation sequence, for example by energising first one phase alone and then the two phases together. The desired position may correspond to one of the transition edges of the RPT signal, i.e. at the boundary of a 15 degree region. In practice, the rotor may come to rest at either side of this transition. However, the correct phase switching sequence on starting can be assured by noted whether the signal is high or lower, i.e. in which of the 15-degree regions the rotor is positioned.

The system described allows full starting torque in either direction of rotation. The system can be simplified for drives which require only modest starting torque and in which the ratio of friction to inertia is not high. This development will now be described.

Figure 4:
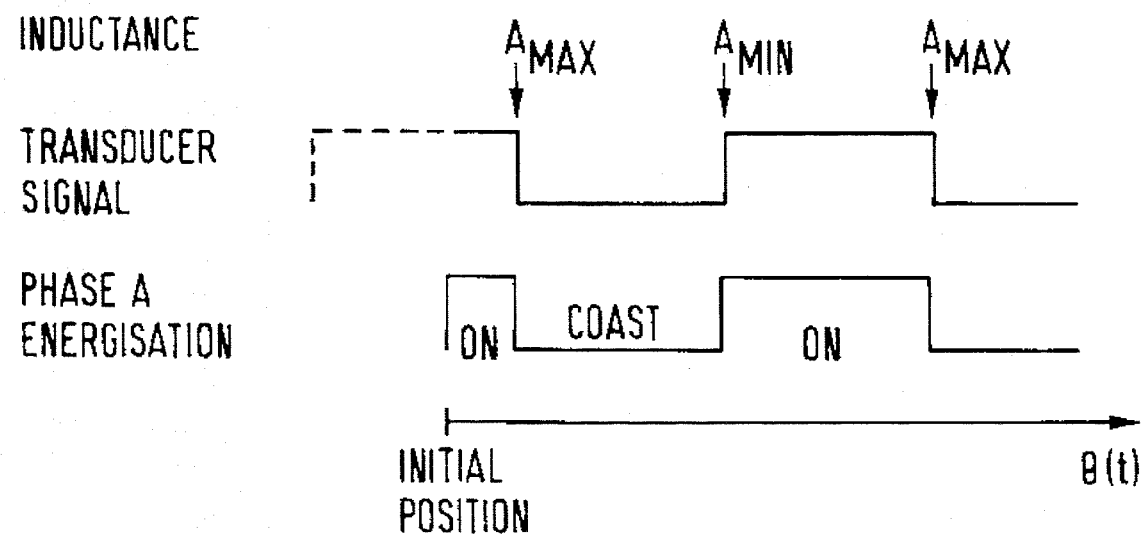
FIG. 4 is a timing diagram for starting a rotor according to the invention.

FIG. 4 illustrates the sensor output and phase energisation for the simplified system. The detector signal transitions may occur in this example at the maximum and minimum inductance of phase A and this signal may therefore be used to control directly the energisation of phase A. The initial rotor position is assumed in FIG. 4 to have been established with both phases A and C energised. Phase C may then be switched off causing the motor to accelerate in the forward direction due to the torque produced by phase A. Phase A is switched off at its position of maximum inductance and the motor then coasts with zero developed torque until phase A is again switched on at the next rising edge of the transducer signal. Thus, one phase is switched directly according to the rising and falling edges of the sensor output. Once the rotor is underway it runs up as a single-phase machine until the motion of the rotor is sufficient for the motor control to establish itself.

There will be a lower limit on the rate of the rotation of the rotor below which the polyphase control is not possible. Once this speed is exceeded and a correct code sequence or sequences have been received, the position of the rotor relative to the stator can be determined and polyphase control according to the invention effected. It is clear that, to ensure starting, the energy imparted to the rotor over the relatively short initial energisation of phase A must be sufficient to carry the rotor against the friction and load torque through more than 45 degrees to the next energisation of phase A. Phase A may then be energised for a full 45 degrees. The motor accelerates in this manner, with only phase A being energised, until a sufficient speed is achieved for reliable timing of energisation of phases B and C from the transducer signal.

It will be clear that the motor may be started in the reverse direction of rotation if the initial rotor position is established with phases A and B energised and if the transducer signal is inverted. The coded rotating member has been positioned so that in the example phase A is initially excited. Repositioning of the member would allow either phase B or C to be the initially excited phase.

Figure 5:
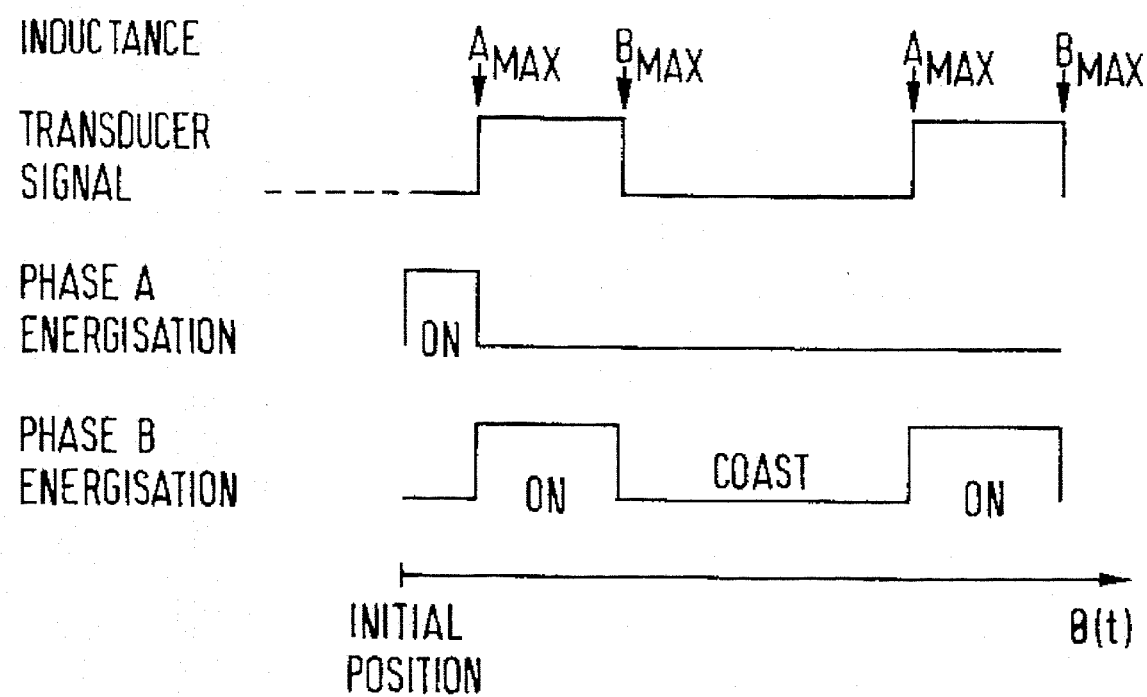
FIG. 5 is a timing diagram of a modification of the starting procedure.

The severity of the restriction on starting torque may be reduced by modifying the system as follows. The transducer coded disc is modified to give a signal as illustrated in FIG. 5, i.e. with a mark:space ratio of 1:2, with the rising edges corresponding to the maximum inductance of phase A and the falling edge to the maximum of phase B. The rotor may be initially positioned with phases A and C energised as before. Starting is initiated by turning off phase C, leaving A energised. At the sensor edge, phase A is turned off. Up to this point the arrangement is unchanged, with the same amount of energy being imparted to the rotor as in the unmodified system. However, as phase A is turned off, phase B is turned on. The rotor continues to rotate to the aligned position of phase B, when B is turned off, and it will then coast to the next RPT signal edge.

This arrangement gives a higher initial pulse of energy to the rotor before coasting, and after the aligned position of B is reached, the drive will run up using phase B only. Note that only 30 degrees of the B phase region is used for such operation.

The specific example described above is a 6/4-pole, 3-phase motor drive. In this case the code sequence repeats itself four times in the rotor cycle to coincide with the number of rotor poles. For a different number of rotor poles a corresponding number of repetitions of the code sequence can be used so that the position of the rotor from a known start-up position can be determined. Of course, a single sequence for the rotor cycle can be used. However, the delay before a complete cycle has been read may be too long. It will be clear that the invention may be used for motors with other pole combinations and with phase numbers other than three. It will also be clear that the invention may be used for generators as well as motors. The RPT detector may use optical, Hall-effect, inductive or other means.

This method according to the invention can be used to start a single phase machine bearing the rotor position encoder. The location of the rotor can be defined by using any of a number of known methods such that the rotor position will be the same each time. For example see EP-A-0601818 in which a host pole carries a permanent magnet that holds the rotor in a start position while it is at rest. The rotor position encoder is then used to monitor the position of the rotor within the cycle on start-up. The single phase is energised and the rising (i.e. leading) edges evenly spaced on the encoder are counted until the maximum inductance position is reached. At this point the phase is de-energised. The motor then freewheels from this known position until the correct phase energisation position is indicated by counting the rising edges again. Depending on the length of the code, the code sequence will be recognised eventually. The position calculated by counting the rising edges from the position of maximum inductance can then be confirmed from the recognised sequence or corrected.

Similarly, the method can be used to start a two phase machine. Both motor phases are energised to bring the rotor into a known position. One phase is then de-energised to cause the rotor to move in a defined direction. The sensor/controller arrangement then counts the rising edges until it is calculated that the rotor has reached a position at which the remaining energised phase can be turned off and the de-energised phase turned on again. When the encoder code sequence is eventually recognised the rotor position can be confirmed or corrected as counted from the known start-up position.

As an alternative the two-phase start sequence may comprise energising one motor phase to rotate the rotor to a known position (eg. of maximum inductance), de-energising the energised one phase and then energising the other phase. The rising edges from the encoder are counted from energisation of the other phase to determine when to switch it off and turn on the one phase again. Again, the code sequence will eventually be decoded so that the counted rotor position can be confirmed or corrected.

A further method of starting a polyphase electric machine comprises first starting as a stepper motor without rotor position feedback instead of establishing first a known initial rotor position, i.e. using open-loop stepping to start the motor and cause it to run at low speed. This may be accomplished by feeding timing pulses in sequence to the phases from a fixed or variable-frequency oscillator. Thereafter control of switching can be transferred from open-loop stepping to sensor-based control. The sensor output is then used to check the angular position of the rotor through the code sequence.

We claim:

1. A control system for an electric machine having a rotor defining rotor poles arranged to rotate relative to a stator, the system comprising a controller, switch means for the or each phase of the machine which switch means are actuatable by the controller, a set of rising edges and falling edges arranged in a path to rotate with the rotor and a single-path sensor arranged to be influenced by the rising and falling edges in the path as they rotate with the rotor to produce an output receivable by the controller, the set of rising edges and falling edges defining the output of the sensor in the form of a digital code which is periodic with the phase inductance cycle of the machine, the code being decodable by the controller to indicate the positions of the rotor poles in the rotor cycle relative to the stator, the set including sensor output influencing rising edges in evenly spaced positions in the path and sensor output influencing falling edges in unevenly spaced positions in the path.

2. A rotor position encoder, defining a position code for a rotor of an electric machine relative to its stator, the encoder comprising: a set of rising edges and falling edges disposed in a path on the encoder and arranged to rotate with the rotor for influencing the output of a sensor, the set having sensor output influencing first edges which are in evenly spaced angular positions in the path, and sensor output influencing second edges which are in unevenly spaced angular positions in the path, the said angular positions of the second edges in the path relative to the first edges in the path being decodable as a sequence such that the position of the rotor relative to the stator is determinable from the sequence.

3. An encoder as claimed in claim 2 in which the evenly spaced first edges coincide with the power switching actuation positions of the rotor poles, or otherwise indicate the positions of the rotor poles, relative to the stator poles from which edges the power switching timing is derivable.

4. An encoder as claimed in claim 2 in which the first edges are interjacent the second edges.

5. An encoder as claimed in claim 2 in which the first and second edges are arranged on a unitary structure.

6. An encoder as claimed in claim 5 in which the first edges form one of leading and trailing edges and the second edges form the other of leading and trailing edges.

7. An encoder as claimed in claim 2 in which the first and second edges include angularly extending regions of varying light transmissivity, light reflectivity, magnetism, capacitance or inductance.

8. An encoder as claimed in claim 2 in which the sequence is periodic with the phase inductance cycle of the machine.

9. A control system for an electric machine comprising a sensor, an encoder operably connected to rotate with a rotor of the electric machine, the encoder defining a position code for the rotor relative to a stator of the electric machine, the encoder comprising: a set of rising edges and falling edges disposed in a path on the encoder and mountable to rotate with the rotor for influencing the output of the sensor, the set having sensor output influencing first edges which are in evenly spaced angular positions in the path and sensor output influencing second edges which are in unevenly spaced angular positions in the path, the said angular positions of the second edges in the path relative to the first edges in the path being decodable as a sequence such that the position of the rotor relative to the stator is determinable from the sequence; the system further including control means, including signal storage means, supplied with the output from the sensor and operable to store the sequence to determine the position of the rotor relative to the stator from the state of the sequence; and machine phase switching means which are actuatable by the control means according to the determined position of the rotor relative to the stator.

10. A system as claimed in claim 9 in which the sensor is arranged to provide a signal transition to denote the passage of one of the first or one of the second edges.

11. A system as claimed in claim 10 in which transitions in one sense indicate the first edges and transitions in the opposite sense indicate the second edges.

12. A system as claimed in claim 10 in which the control means also include clock means for determining the interval between transitions, and decoding means arranged to decode the intervals between transitions in the sequence.

13. A system as claimed in claim 9 in which the storage means include shift register means for receiving the sequence serially as the rotor rotates, the shift register means being readable by the control means to determine the state of the sequence.

14. A system as claimed in claim 9 in which the sequence is periodic with the phase inductance cycle of the machine.

15. A system as claimed in claim 9 in which the control means are arranged to move the rotor to an initial predetermined start position of the rotor relative to the stator.

16. A method of controlling an electric machine which includes an encoder defining a position code for a rotor of the electric machine relative to its stator, the encoder comprising: a set of rising edges and falling edges disposed in a path on the encoder and arranged to rotate with the rotor for influencing the output of the sensor, the set having sensor output influencing first edges which are in evenly spaced angular positions in the path, and sensor output influencing second edges which are in unevenly spaced angular positions in the path, the said angular positions of the second edges in the path relative to the first edges in the path being decodable as a sequence such that the position of the rotor relative to the stator is determinable from the sequence; the method comprising sensing the movement of the rising edges and falling edges in the path past the sensor; decoding the sequence from the second edges of the features in the path; determining the switching phase for the machine according to the state of the sequence; and timing the switching of the machine according to the first edges of the said set in the path passing the sensor.

17. A method as claimed in claim 16 in which the passage of the first edges of the encoder is used as a running count to maintain a contemporaneous account of the position of the rotor relative to the stator and the code sequence is used to derive or to re-establish the rotor position information in the event that it is lost or corrupted.

18. A method of starting an electric machine comprising a rotor defining rotor poles, a stator defining stator poles, an encoder arranged to rotate with the rotor and to provide a rotor position code, a sensor arranged to be influenced by the encoder according to the position code and to produce an output thereof, and a controller for receiving the output from the sensor, the encoder comprising a set of rising edges and falling edges disposed in a path on the encoder and mountable to rotate with the rotor for influencing the output of the sensor, the set having sensor output influencing first edges which are in evenly spaced angular positions in the path, and sensor output influencing second edges which are in unevenly spaced angular positions in the path, the said angular positions of the second edges in the path relative to the first edges in the path being decodable as a sequence such that the position of the rotor relative to the stator is determinable from the sequence; the method comprising: energizing at least a selection of the stator poles to orientate the rotor with respect to the stator into a predetermined position; initiating a count of the first edges of the encoder in the path from the known position; accelerating the rotor according to the continued energisation of the stator poles based on the position count derived from the first edges of the encoder in the path and thereafter checking the rotor position from the count with the decoded sequence.

19. A method as claimed in claim 18 in which the machine is a polyphase electric machine, the method comprising energising a set of the stator poles associated with one phase so that the rotor assumes the predetermined position substantially of maximum inductance for the said set of stator poles in relation to the rotor; de-energising the stator poles of the one phase; energising an adjacent set of poles associated with another of the phases; monitoring the passage of the rotor past the stator poles according to the position code from the encoder; and energising successive sets of stator poles associated with successive phases in accordance with the monitored movement of the rotor in relation to the stator.

20. A method of starting a polyphase electric machine comprising a rotor, a stator, a rotor position encoder mounted to rotate with the rotor and a single-path sensor having an output which is influenced by the encoder, the encoder having angularly evenly spaced edges in a path which are periodic with the phase inductance cycle of the machine, the method comprising: energising the set of poles of adjacent phases of the machine so that the rotor assumes the position intermediate the maximum inductance positions associated with the two phases; de-energising one of the sets of poles such that the rotor rotates towards the maximum inductance position of the other energised set of poles; monitoring the passage of the rotor past the stator poles according to a position code derived from the encoder; de-energising the other of the set of poles at a moment that assists in allowing the rotor to freewheel past the said maximum inductance position and continuing single phase rotation of the rotor by energising and de-energising the said other phase according to the monitored position of the rotor.

21. A method as claimed in claim 20 in which the encoder comprises: a set of edges in the path arranged to rotate with the rotor for influencing the output of a sensor, the set having sensor output influencing first edges which are in evenly spaced angular positions in the path, and sensor output influencing second edges which are in unevenly spaced angular positions in the path, the said angular positions of the second edges in the path relative to the first edges in the path being decodable as a sequence such that the position of the rotor relative to the stator is determinable from the sequence, the method including counting the said first edges to monitor the passage of the rotor past the stator and thereafter checking the rotor position from the count and the decoded sequence.

22. A method as claimed in claim 20, in which the machine is a polyphase electric machine the method comprising: energising the stator poles of adjacent phases of the machine so that the rotor assumes a position intermediate the maximum inductance positions associated with the two phases, de-energising one of the sets of poles so that the rotor rotates towards the maximum inductance position of the second energised set of poles; monitoring the passage of the rotor past the stator poles according to the position code on the rotor; de-energising the second set of stator poles and energising a third set of stator poles to maintain rotation of the rotor thereafter to maintain single phase rotation of the rotor by energising and de-energising the said third set of stator poles according to the monitored position of the rotor.

23. A method of starting a single phase electric machine comprising a rotor defining rotor poles, a stator defining stator poles, an encoder arranged to rotate with the rotor and to provide a rotor position code, a sensor arranged to be influenced by the encoder according to the position code and to produce an output thereof, and a controller for receiving the output from the sensor, the encoder comprising a set of rising edges and falling edges arranged in a path on the encoder to rotate with the rotor for influencing the output of the sensor, the set having sensor output influencing first edges which are in evenly spaced angular positions in the path, and sensor output influencing second edges which are in unevenly spaced angular positions in the path, the said angular positions of the second edges in the path relative to the first edges in the path being decodable as a sequence such that the position of the rotor relative to the stator is determinable from the sequence, the method comprising: energising the stator poles; monitoring the passage of the rotor past the stator poles by counting the said first edges in the path; de-energising the stator poles when a position of maximum inductance of the rotor relative to the stator is reached; allowing the rotor to freewheel until the rotor reaches a position at which re-energisation of the stator poles will continue rotation of the rotor, as indicated by the count of the said first edges in the path; thereafter checking the rotor position count with the decoded sequence.

24. The rotor position encoder of claim 2, wherein the path is a single path.

25. The control system of claim 9, wherein the path is a single path.

26. The method of claim 16, where the path is a single path and the sensing, decoding and timing steps occur with respect to the single path.

27. The method of claim 18 wherein the path is a single path and the initiating and accelerating steps occur with respect to the single path.

28. The method of claim 23, wherein the path is a single path and the monitoring and allowing steps occur with respect to the single path.

* * * * *